United States Patent
Chuang

(10) Patent No.: US 10,914,531 B2
(45) Date of Patent: Feb. 9, 2021

(54) HEAT-SINK BASE PROVIDED WITH HEAT-SINK FIN PORTIONS, METHOD FOR PRODUCING SAME AND MOTOR PROVIDED WITH SAME

(71) Applicant: Atieva, Inc., Redwood City, CA (US)

(72) Inventor: Chia-Ming Chuang, Taipei (TW)

(73) Assignee: Atieva, Inc., Redwood City, CA (US)

( * ) Notice: Subject to any disclaimer, the term of this patent is extended or adjusted under 35 U.S.C. 154(b) by 876 days.

(21) Appl. No.: 13/940,170

(22) Filed: Jul. 11, 2013

(65) Prior Publication Data

US 2014/0070644 A1 Mar. 13, 2014

(30) Foreign Application Priority Data

Sep. 12, 2012 (CN) .......................... 2012 1 0335572

(51) Int. Cl.
*H02K 9/22* (2006.01)
*H02K 5/20* (2006.01)
(Continued)

(52) U.S. Cl.
CPC .................. *F28F 3/00* (2013.01); *B22C 9/02* (2013.01); *B22C 9/046* (2013.01);
(Continued)

(58) Field of Classification Search
CPC ............ H02K 9/22; H02K 5/20; H02K 15/14; H02K 5/18; F28F 3/00; B22C 9/02;
(Continued)

(56) References Cited

U.S. PATENT DOCUMENTS 5,558,155 A * 9/1996 Ito .......................... B23K 1/0012
165/185
5,791,406 A * 8/1998 Gonner ............... H01L 21/4882
165/185
(Continued)

FOREIGN PATENT DOCUMENTS

JP 59021250 A * 2/1984

OTHER PUBLICATIONS

Machine Translation, Watanabe, JP 59021250 A, Feb. 3, 1984.*
"Construction, n." OED Online. Oxford University Press, Mar. 2018. Web. May 22, 2018.*

*Primary Examiner* — Thomas Truong
(74) *Attorney, Agent, or Firm* — Brake Hughes Bellermann LLP

(57) ABSTRACT

The present invention relates to a heat-sink base provided with heat-sink fin portions, it manufacturing method and a motor provided with the heat-sink base. The base is produced by pouring cast metal into a mold cavity to replace a pattern having a predetermined sublimation temperature. The base includes a preformed heat-sink member comprising a plurality of heat-sink fin portions and at least one anchor portion embedded at least partially in the pattern, and a base body comprising an enclosed base portion and a holder portion for receiving and holding the at least one anchor portion. By virtue of the invented method, the heat-sink member having an extremely thin thickness can be mounted on the base body and the overall surface area of the heat-sink base is increased considerably.

14 Claims, 10 Drawing Sheets

(51) Int. Cl.
*F28F 3/00* (2006.01)
*H02K 5/18* (2006.01)
*H02K 15/14* (2006.01)
*B22C 9/02* (2006.01)
*B22C 9/04* (2006.01)
*B22D 19/00* (2006.01)
*B22D 19/04* (2006.01)
*B23P 15/26* (2006.01)

(52) U.S. Cl.
CPC ......... *B22D 19/0054* (2013.01); *B22D 19/04* (2013.01); *H02K 5/18* (2013.01); *H02K 5/20* (2013.01); *H02K 9/22* (2013.01); *H02K 15/14* (2013.01); *B23P 15/26* (2013.01); *B23P 2700/10* (2013.01); *Y10T 29/4935* (2015.01)

(58) Field of Classification Search
CPC .... B22C 9/046; B22D 19/0054; B22D 19/04; B23P 2700/10; B23P 15/26; Y10T 29/4935

USPC .............................. 310/64; 165/185, 78, 80.3
See application file for complete search history.

(56) References Cited

U.S. PATENT DOCUMENTS

| | | | |
|---|---|---|---|
| 6,009,937 A * | 1/2000 | Gonner | F28F 3/02 165/185 |
| 6,408,935 B1 * | 6/2002 | DeHoff | H01L 23/3737 165/104.33 |
| 6,422,307 B1 * | 7/2002 | Bhatti | F28F 3/02 165/185 |
| 6,681,847 B1 * | 1/2004 | Lee | B22F 7/062 165/185 |
| 2011/0234029 A1 * | 9/2011 | Pal | H02K 1/20 310/54 |

* cited by examiner

HEAT-SINK BASE PROVIDED WITH HEAT-SINK FIN PORTIONS, METHOD FOR PRODUCING SAME AND MOTOR PROVIDED WITH SAME

FIELD OF THE INVENTION

The present invention relates to a heat-sink base, and more specifically to a heat-sink base provided with heat-sink fin portions and manufactured by a Lost Foam Casting process, as well as a motor provided with the heat-sink base.

DESCRIPTION OF THE RELATED ART

As the earth is running out of fossil fuel reserves, the use of clean energy has drawn increasing interest. With this trend, electric motors, which commonly serve as a power output device in mechanical equipments, are increasingly being used in automobiles to replace combustion engines. However, the improved capability of electric motors, light-emitting diode lamps, semiconductor processors, and electrical and electronic devices inevitably results in a significant increase in heat generation. A variety of heat-sink devices have been developed to fulfill higher demands on the need for heat dissipation. For an electric vehicle, it would be advantageous to have an efficient heat sinking structure on the electric motor, so that the motor can operate at a lower temperature for a given power rating, or to increase power and still maintain within the safe temperature envelop of the motor design.

If the electric motor has a heat-sink structure with low heat dissipation efficiency, it would be forced to work at higher temperatures beyond the safe temperature envelop of the motor design, which degrades the mechanical reliability, shortens the life of the lubricating oil, and compromises the service life of the motor. In the worst case, winding wire insulations could fail at high temperature, causing a catastrophic short circuit that destroys the motor, or the permanent magnets lost their magnetic property and render the motor inoperative. For the vehicle operation, sudden motor failure could cause an accident that puts passengers at risk. Therefore, it is very important to keep the electric motor operating under the safe temperature envelop.

In the conventional construction, a heat-sink device typically comprises a base and multiple heat dissipation plates mounted on the base. The electric motor is normally provided with additional heat-sink fins, so that the heat generated by the stator and the rotor of the motor can be easily transferred via the heat-sink fins to the ambient. In order to facilitate heat dissipation away from the motor, a cooling fan may be further provided to generate an air flow that facilitates heat removal from the heat-sink fins.

In brief, a traditional way to enhance the heat dissipation capability of a heat-sink device is to increase the surface area of the heat-sink device, thereby facilitating heat exchange between the heat-sink device and ambient air. However, the heat-sink fins produced by the conventional manufacture processes, such as casting, extrusion molding and precision machining, must have a minimum thickness to withstand deformation and breakage during processing. The conventional heat-sink fins are typically made of, for example, aluminum plates having a thickness of more than 1 mm, meaning that a maximum of 5-6 heat-sink fins, and sometimes only 3-4 fins, can be housed within an interval of 1 centimeter width when taking into account the ventilation gaps between the adjacent heat-sink fins. As a result of the limitation on the manufacture processes, the surface area of the heat-sink base and the number of heat-sink fins that can be made thereon have reached the limits of existing technologies, and became a major bottleneck for the development of high power density motors and other heat-generating equipments.

In order to increase heat-sink surface area, fin area and number of fins per unit area must be increased. The size of fin area is dictated by mechanical footprint and hard to enlarge, while the number of fins per unit area is limited by manufacturing technologies at hand. The inventor has devised a new method for fabricating a heat-sink base that can increase the fin density dramatically. The invented method is based on the Lost Foam Casting process, which involves covering a pattern made from polystyrene foam with sand to produce a sand mold, pouring molten metal into the sand mold to vaporize the pattern and filling the mold cavity with molten metal, and allowing the molten metal to cool and solidify into the shape of the pattern. Since the pattern is vaporized during pouring of the molten metal, there is no need for draft or parting lines that limits shapes of patterns as in a conventional molding process, and the method is advantageous for fabrication of high density, complex precision castings. In other words, the heat-sink devices manufactured by the Lost Foam Casting process can be more sophisticated in terms of structure and density as compared to those produced by the conventional casting methods.

The pattern used in the Lost Foam Casting process must still be of a minimum thickness. If the pattern is too thin, the molten metal would have difficulty distributing evenly within the void space formed by vaporization of the pattern due to the viscosity of the molten metal. This would in turn cause the occurrence of air bubbles or unacceptable defects in the finished products and low production yield. As a consequence, the thickness of the heat-sink fins thus manufactured will still be unsatisfactory. Therefore, the Lost Foam Casting process known in the art is insufficient for achieving the objects of the invention, and there exists a need for an improved method of producing a heat-sink device that overcomes the deficiencies described above. The present invention provides a solution in response to the need.

SUMMARY OF THE INVENTION

Accordingly, an object of the present invention is to provide a heat-sink base with multiple heat-sink fin portions, thereby increasing the overall surface area for heat exchange with the ambient and enhancing heat dissipation efficiency.

Another object of the invention is to provide a heat-sink base with heat-sink fin portions, in which multiple ventilation channels are formed to facilitate heat dissipation.

It is still another object of the invention to provide a heat-sink base with heat-sink fin portions, which is produced by a Lost Foam Casting process with high yield.

It is still another object of the invention to provide a method for producing a heat-sink base having an increased overall surface area for heat exchange with the ambient and enhanced heat dissipation efficiency.

It is still another object of the invention to provide a method for producing a heat-sink base, in which multiple ventilation channels are formed to facilitate heat dissipation.

It is still another object of the invention to provide a method for producing a heat-sink base, in which the conventional mold removal step is omitted and the heat-sink base is produced with high yield.

It is still another object of the invention to provide a motor installed with a heat-sink base, in which the total number of the heat-sink fin portions and the overall surface area for heat exchange are increased.

It is still another object of the invention to provide a motor installed with a heat-sink base, which has a simplified structure and is formed with multiple ventilation channels to facilitate heat dissipation, thereby increasing the performance cost ratio of the motor.

In order to achieve the objects described above, the present invention provides a heat-sink base provided with heat-sink fin portions, a method for producing the same and a motor provided with the same. The heat-sink base is produced by pouring cast metal into a mold cavity to replace a pattern having a predetermined sublimation temperature. The heat-sink base comprises a preformed heat-sink member comprising a plurality of heat-sink fin portions and at least one anchor portion embedded at least partially in the pattern, and a base body comprising an enclosed base portion and a holder portion for receiving and holding the at least one anchor portion.

The method for producing the heat-sink base comprises the steps of: a) placing a pattern having a predetermined sublimation temperature and inserted with the at least one anchor portion into a chamber, wherein the preformed heat-sink member has a predetermined melting point; b) filling the chamber with molding sand having a phase transformation temperature higher than the sublimation temperature of the pattern, thereby defining a space occupied by the pattern and the heat-sink member; c) melting a base material to its molten state, wherein the base material has a melting point higher than the predetermined sublimation temperature of the pattern and lower than the phase transformation temperature of the molding sand; d) pouring the molten base material into the space to make the pattern sublimated; and e) cooling the base material to a temperature below its melting point, so that the pattern is replaced by the base material to produce the base body inserted with the at least one anchor portion of the heat-sink member.

Since the heat-sink member is preformed before the casting operation, the heat-sink portions can be fabricated into an extremely thin configuration and compactly arranged on the base body. As a result, the overall surface area of the heat-sink base in contact with the ambient is increased considerably, and the heat exchange efficiency is enhanced remarkably. Particularly, the preformed heat-sink member is inserted into the pattern, and only the pattern is subjected to the Lost Foam Casting process. Therefore, in the resultant heat-sink base, the preformed heat-sink member and the base body manufactured by the Lost Foam Casting process are so intimately joined together that the heat transfer therebetween is maximized and that the heat-sink base can be fabricated with high yield.

Furthermore, since the ventilation channels are formed by assembling the heat-sink member, the structure of the heat-sink base is quite simple and the heat transfer between the heat-sink member and the base body is maximized. The motor provided with the invented heat-sink base is therefore imparted with an excellent heat dissipation ability and a prolonged service life.

In addition, ventilation channels can be segmented to enhance air turbulence with minimal resistance to further enhance heat remove efficiency.

BRIEF DESCRIPTION OF THE DRAWINGS

The foregoing and other features and advantages of the invention may be more completely understood in consideration of the following detailed description of various embodiments of the invention in connection with the accompanying drawings, wherein similar numerals designate like parts.

DETAILED DESCRIPTION OF THE INVENTION

Figure 1:
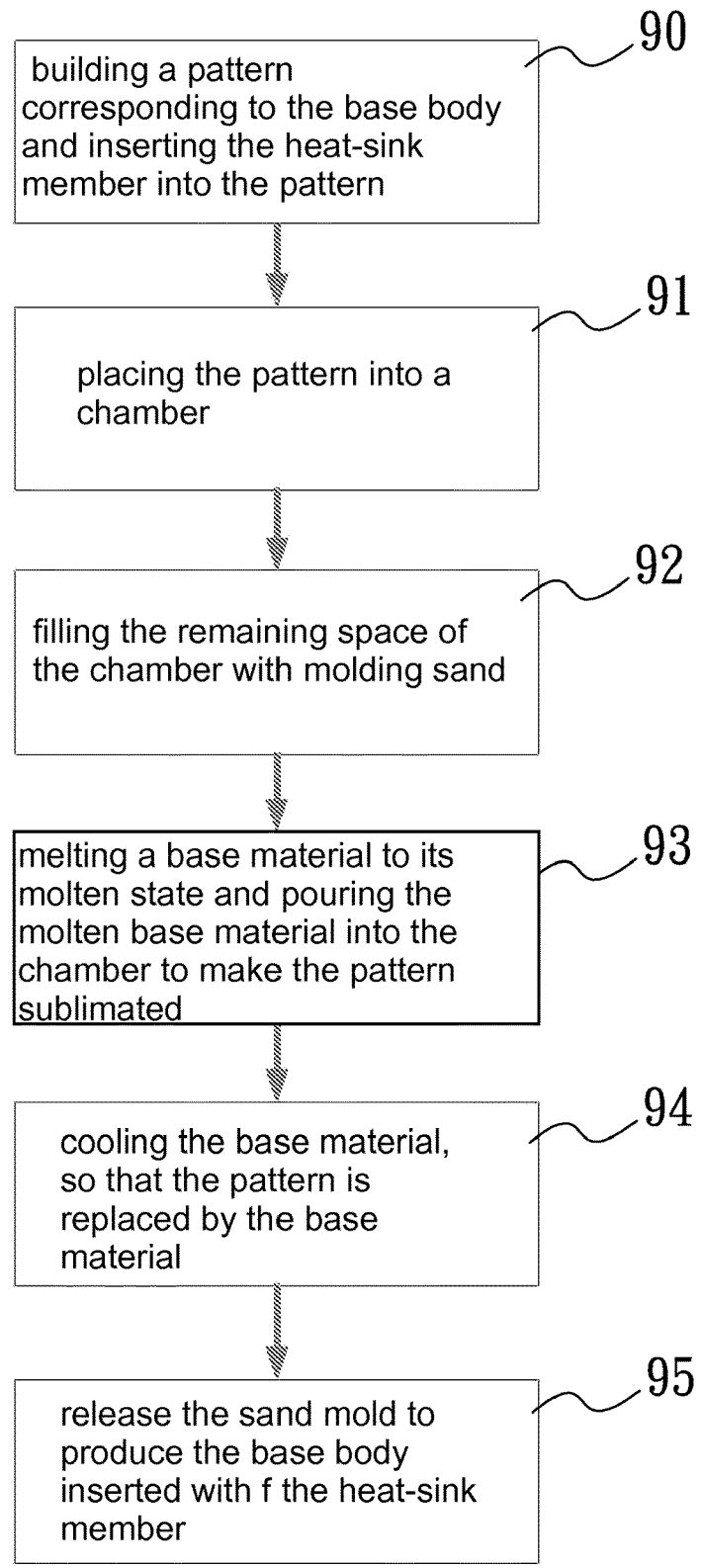
FIG. 1 is a flowchart showing the method for producing the heat-sink base provided with heat-sink fin portions according to the first preferred embodiment of the invention.
Figure 2:
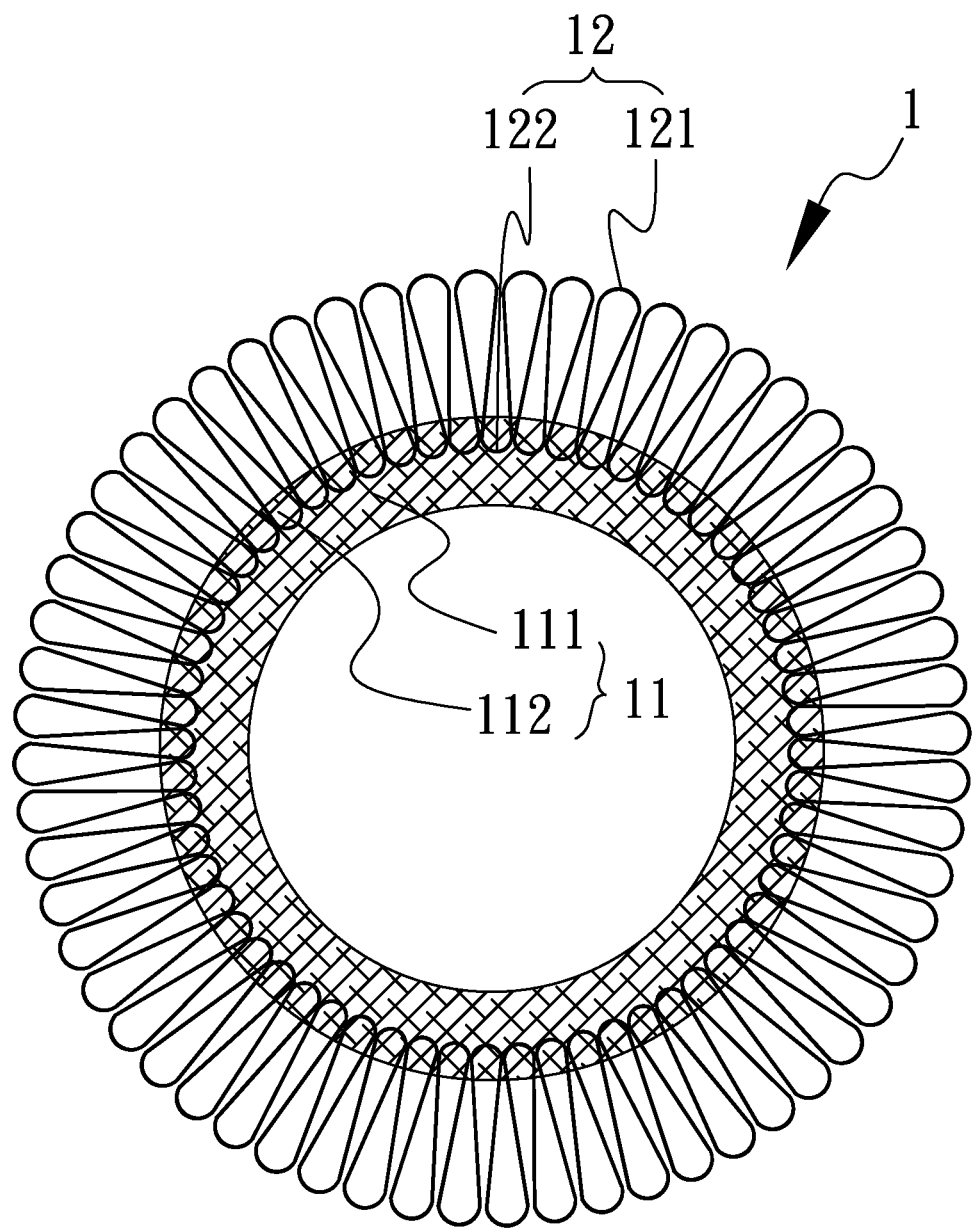
FIG. 2 is a schematic diagram illustrating the heat-sink base produced by the method shown in FIG. 1 according to the first preferred embodiment of the invention.
Figure 3:
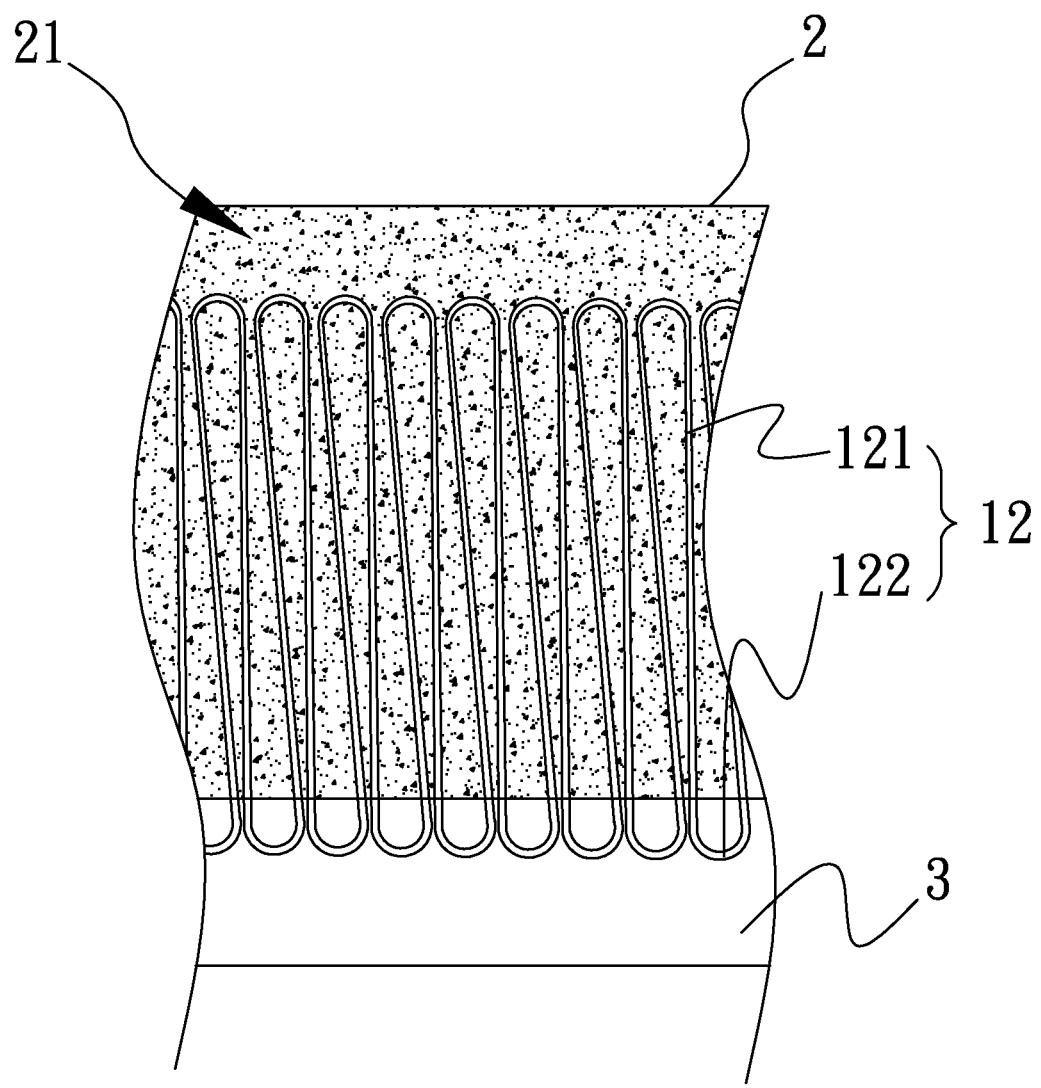
FIGS. 3 and 4 are schematic diagrams showing the materials and structures before and after the implementation of the Lost Foam Casting, respectively.
Figure 4:
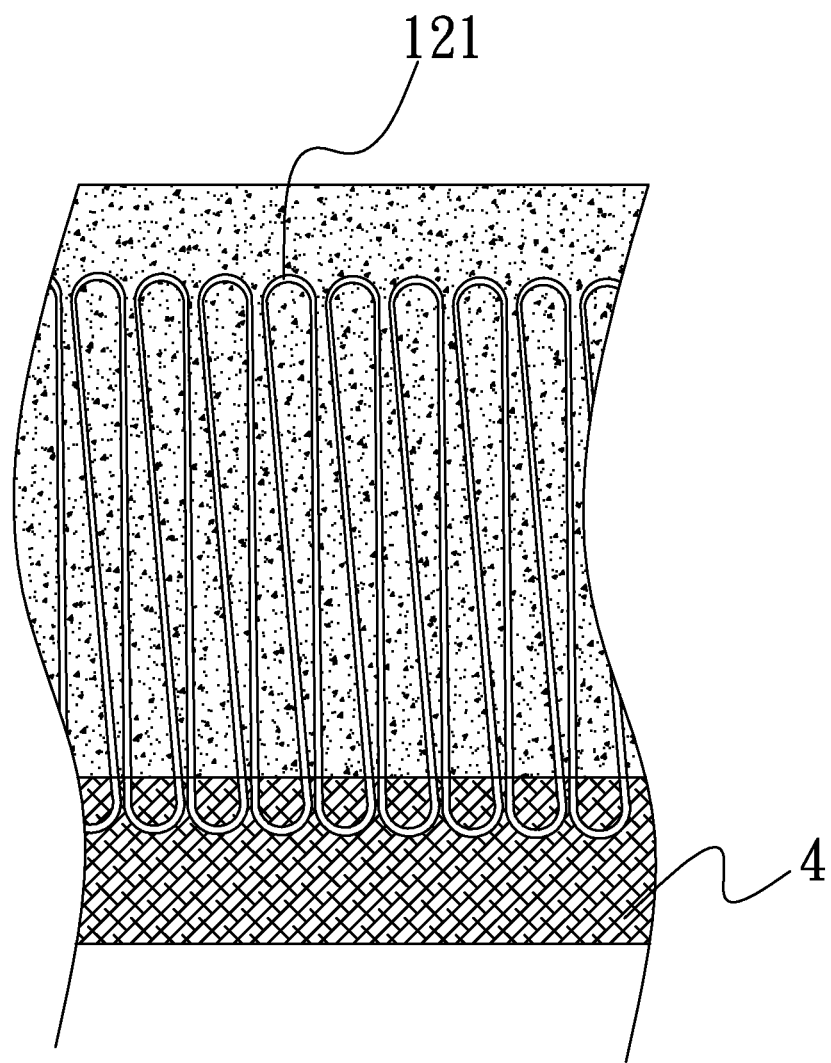

In an aspect, the present invention generally relates to a heat-sink base provided with heat-sink fin portions and a method for producing the same. FIG. 1 is a flowchart of the method for producing the heat-sink base according to a preferred embodiment of the present invention. FIG. 2 is a schematic diagram showing the structure of the heat-sink base produced according to the flowchart of FIG. 1. FIGS. 3 and 4 are schematic diagrams showing the materials and structures before and after the implementation of the Lost Foam Casting, respectively. As shown in FIG. 2, the heat-sink base 1 according to this embodiment primarily comprises a base body 11 and a heat-sink member 12 arranged over the base body 11.

The base body 11 includes an enclosed tubular base portion 111 and a recessed holder portion 112 formed on the enclosed tubular base portion 111 and adapted for receiving and clamping the preformed heat-sink member 12. As shown in FIG. 2, the heat-sink member 12 extends along the periphery of the base body 11 and is partially embedded in the base body 11. For the purpose of illustration, the heat-sink member 12 described herein may, by way of example, be an elongated and repeatedly folded aluminum alloy foil. In this configuration, the heat-sink member 12 includes several folded portions held by the holder portion 112, which are defined herein as anchor portions 122. The remaining part of the heat-sink member 12 comprises straight portions and free folded portions extending among the respective anchor portions 122 and all together acting as heat-sink fin portions 121 for heat exchange with the ambient. It should be noted that the enclosed base portion 111 is depicted in an exaggeratedly enlarged manner in FIGS. 3 and 4 and, therefore, appears to be planar.

The heat-sink base disclosed herein is fabricated according to the Lost Foam Casting process shown in FIG. 1. In Step 90 shown in FIG. 1, the invented process starts with building a pattern 3 corresponding to the base body to be produced, followed by inserting at least one anchor portion 122 of the heat-sink member 12 into the pattern 3. In Step 91, the pattern 3 inserted with the anchor portion 122 is placed into a chamber 2. Next, in Step 92, the remaining space of the chamber 2 is loaded with molding sand 21 and the molding sand 21 has a phase transformation temperature higher than the sublimation temperature, so that the chamber 2 is filled up with the molding sand 21 except for the space occupied by the pattern 3 and the heat-sink member 12. A sand mold is thus formed in conformance with the outer profile of the pattern 3, as shown in FIG. 3.

In order to maximize the overall surface area of the heat-sink fin portions 121, the heat-sink member 12 is made from aluminum foil having a thickness of, for example, 0.1 mm. The heat-sink member 12 is not structurally robust but sufficient to withstand deformation during processing. Aluminum has a melting point of approximately 660° C., while the melting point of an aluminum alloy is typically higher than 660° C., depending on the amount and type of dopant. On the other hand, the expanded foam described above will sublimate at a temperature much lower than 660° C. Therefore, in Step 93, an aluminum alloy that is substantially similar to the material for the heat-sink member 12 is melted to molten state as a base material 4 and then poured into the space occupied by the pattern 3, so that the pattern 3 is vaporized or burned away during the pouring and even part of the anchor portion 122 is melted.

In the follow-up Step 94, the base material 4 is allowed to cool to a temperature below its melting point over a period of time, so that the base material 4 is solidified and occupies the space that was once occupied by the pattern 3 in a manner integrated with part of the heat-sink member 12 as shown in FIG. 4. Finally, in Step 95, the sand mold is released by, for example, vibration to obtain the heat-sink base 1 provided with heat-sink member. A person having ordinary skill in the art will readily appreciate that the steam, gas and the vaporized substances generated during casting can be evacuated from the mold cavity, so as to create a near vacuum condition within the sand mold, thereby obtaining a casting with high precision and high quality.

As described above, the base material 4 refers to the material used to produce the base body 11 and, thus, is typically metallic material with high thermal conductivity, such as copper and aluminum. The preformed heat-sink member 12 can be made of material different from the base material 4 in terms of composition or melting point. In addition, coating of a different material on the surface of either the base or the heat-sink member can promote the bonding of the two portions after the process of current invention. The material for the pattern 3 can be selected from polyurethane foams or porous plastics, in addition to polystyrene foams described above. To be clear, the enclosed tubular base portion 111 described above is not intended to mean that the base body 11 is necessarily configured in the form of a sealed tube but to contrast with the fact that the holder portion 112 formed on the base portion 111 may be traversed by the anchor portions 122.

Figure 5:
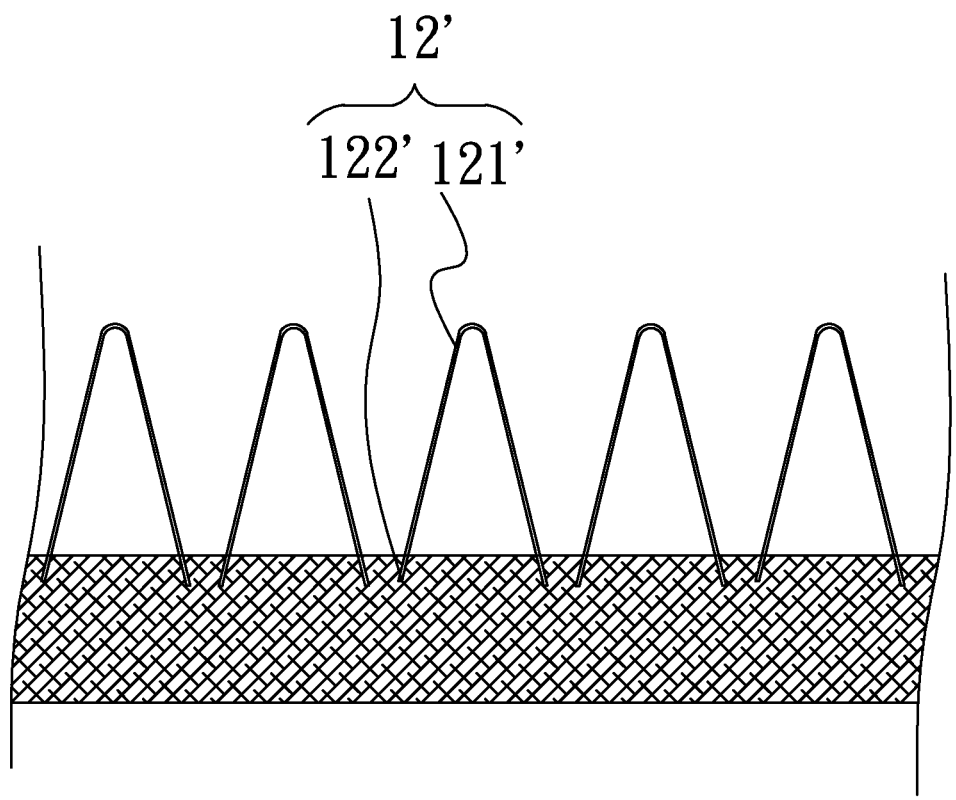
FIG. 5 is a schematic diagram illustrating the heat-sink base provided with heat-sink fin portions according to the second preferred embodiment of the invention.

A person having ordinary skill in the art will also appreciate that in addition to the repeatedly folded configuration shown in FIG. 2, the heat-sink member can be alternatively configured to comprise a number of copper foil sheets according to the second preferred embodiment shown in FIG. 5. The copper foil sheets each includes two end portions held by the holder portion and referred to herein as anchor portions 122'. The portion between two anchor portions 122' is folded once and referred to herein as a heat-sink fin portion 121' for heat exchange with the ambient. The second preferred embodiment described herein can be manufactured in the same way as for the first preferred embodiment discussed above and, thus, the manufacturing process thereof is not redundantly described herein. The base body is particularly depicted to be in a planar shape in FIG. 5, indicating that the heat-sink base disclosed herein is not limited for use with a motor but is generally applicable to any electrical or electronic device, such as a semiconductor device or a light-emitting diode module.

Figure 6:
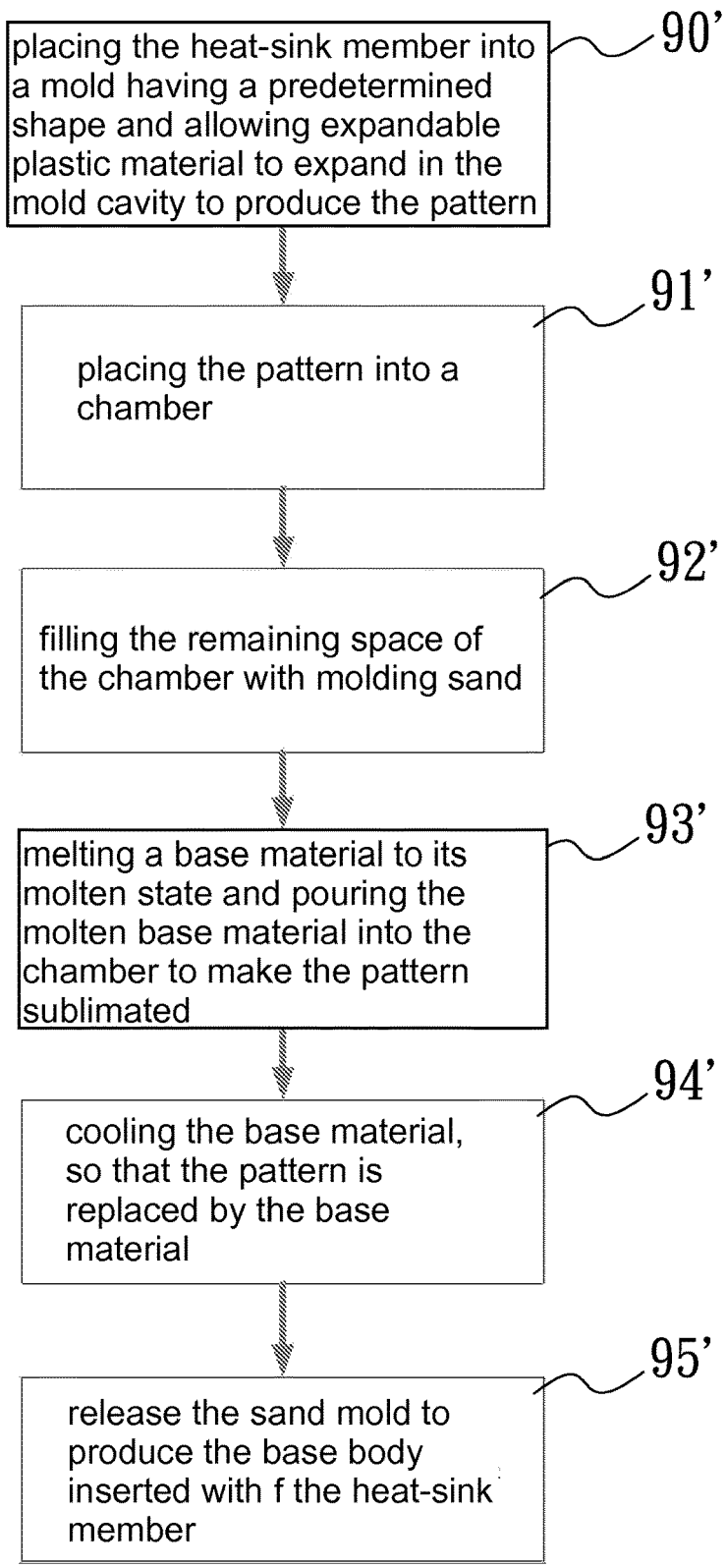
FIG. 6 is a flowchart showing the method for producing the heat-sink base shown in FIG. 5.
Figure 7:
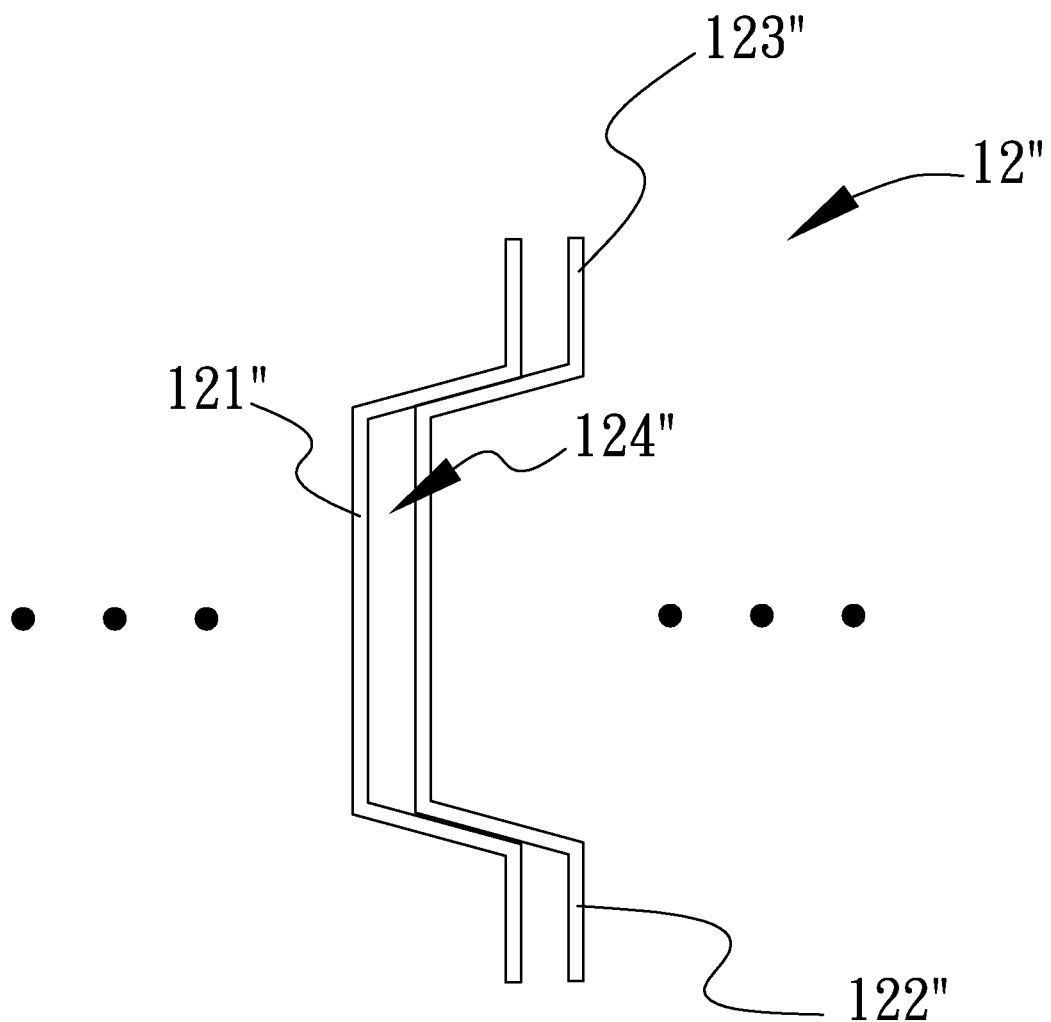
FIG. 7 is a schematic diagram illustrating the heat-sink plates according to the third preferred embodiment of the invention.
Figure 8:
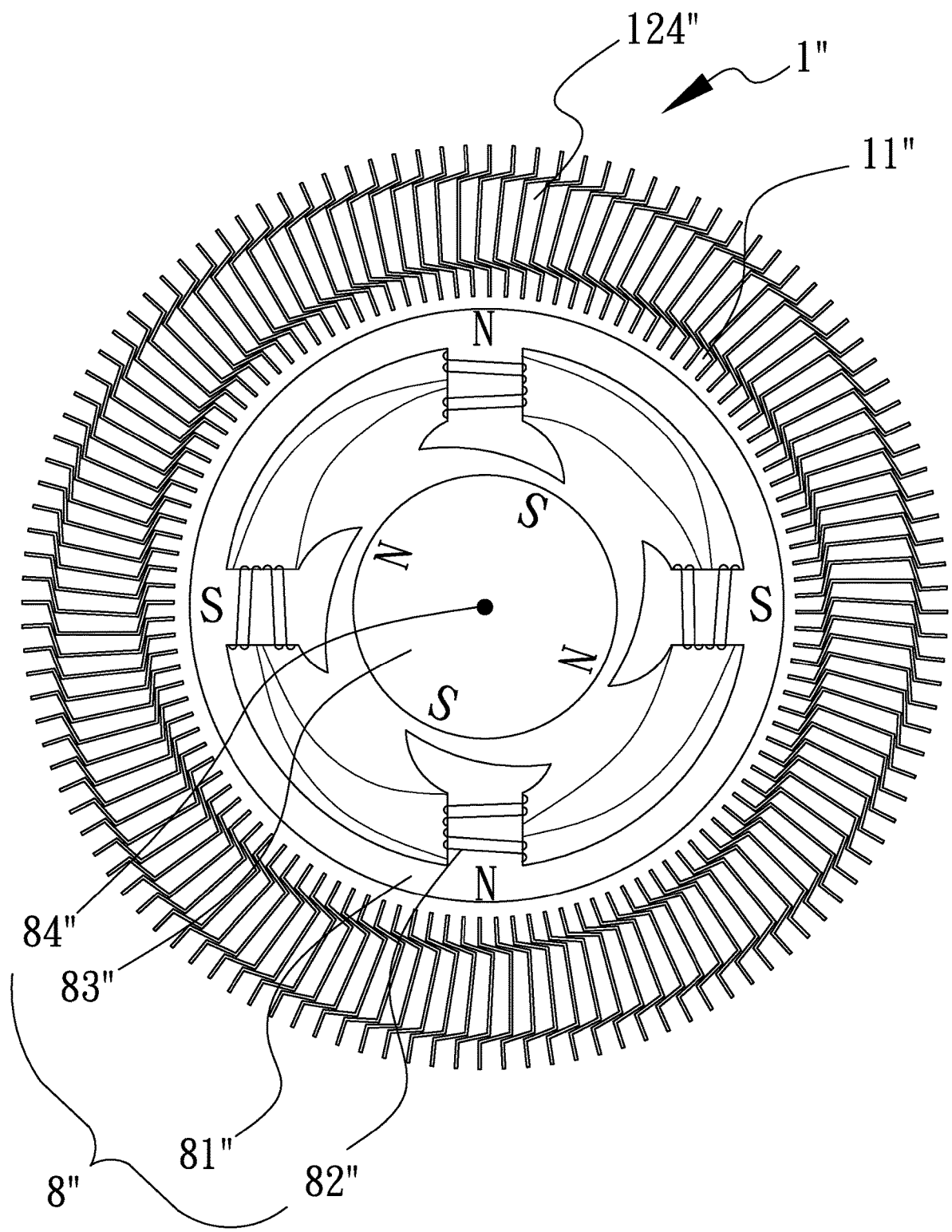
FIG. 8 is a schematic diagram illustrating the motor according to the third preferred embodiment of the invention.

FIGS. 7 and 8 show a third preferred embodiment according to the present invention, in which the heat-sink member 12" is composed of multiple heat-sink plates. Each heat-sink plate includes an L-shaped anchor portion 122" for inserting into the base body, from which an erected heat-sink fin portion 121" extends. An L-shaped closing-up portion 123" extends from the opposite end of the heat-sink fin portion 121" in a manner corresponding to the anchor portion 122", so that two adjacent heat-sink plates constitute an enclosed ventilation channel 124" by virtue of their anchor portions 122", heat-sink fin portions 121" and closing-up portions 123". The enclosed ventilation channel 124" allows air or a liquid fluid flowing therethrough to remove heat from the heat-sink fin portion 121", the anchor portion 122" and the closing-up portion 123". Alternatively, the enclosed ventilation channel 124" permits delivery of heat to the heat-sink plates via a cooling fluid. The heat-sink plates are arranged radially around the base body and engage neighboring heat-sink plates, so that the heat-sink member 12" includes a vast number of compactly arranged ventilation channels 124". Especially, the anchor portions 122" together constitute a stop wall, which is in favor of the fabrication of the pattern. According to Step 90' shown in FIG. 6, the manufacturing process starts with placing the assembled heat-sink member 12" into a mold having a mold cavity complementary to the pattern and the heat-sink member. The mold cavity is loaded with expandable plastic material which is then allowed to expand to fill the mold cavity under a specific condition. During the casting process, the stop wall made up by the anchor portions 122" creates a barrier preventing the expandable plastic material from expanding outside and allowing the expanded foam to fill up the space among the anchor portions 122" to constitute the pattern.

The remaining steps, as denoted from Step 91' to Step 95' in FIG. 6, are identical to Steps 91-95 described in the embodiments above and are not redundantly described herein. The ventilation channels 124" are configured to have a rectangular-like or sector-like shape in cross-section. Since the pattern used in this embodiment is formed from expandable plastic material, the base body 11" manufactured from metallic material, such as an aluminum alloy, in the subsequent steps can sufficiently occupy and fill up the space among and beneath the anchor portions 122". As a result, the base body 11" is fabricated to include an enclosed tubular base portion adapted to house a motor 8". The base body 11" further constitutes an excellent heat dissipation path, through which heat generated due to current flow through the coil 82" of the stator 81" or due to high speed rotation of the rotor 83" around the bearing 84" can be effectively transferred to the heat-sink fin portions 121". The ventilation channels 124" formed in the heat-sink member 12" further facilitate heat dissipation from the heat-sink fin portions 121" to the environment. The air vent of the motor 8" may be further fitted with a cooling fan (not shown) operable to remove hot air from the ventilation channels 124"'. By virtue of the structural arrangement described above, the motor 8"' can be operated under a suitable operating temperature. It is also apparent to those having ordinary skill in the art that the ventilation channels 124"' can be fabricated into a generally square or circular configuration in cross-sectional view and that the heat-sink member 12"' can be made of metallic material including aluminum, copper, iron and the like.

Figure 9:
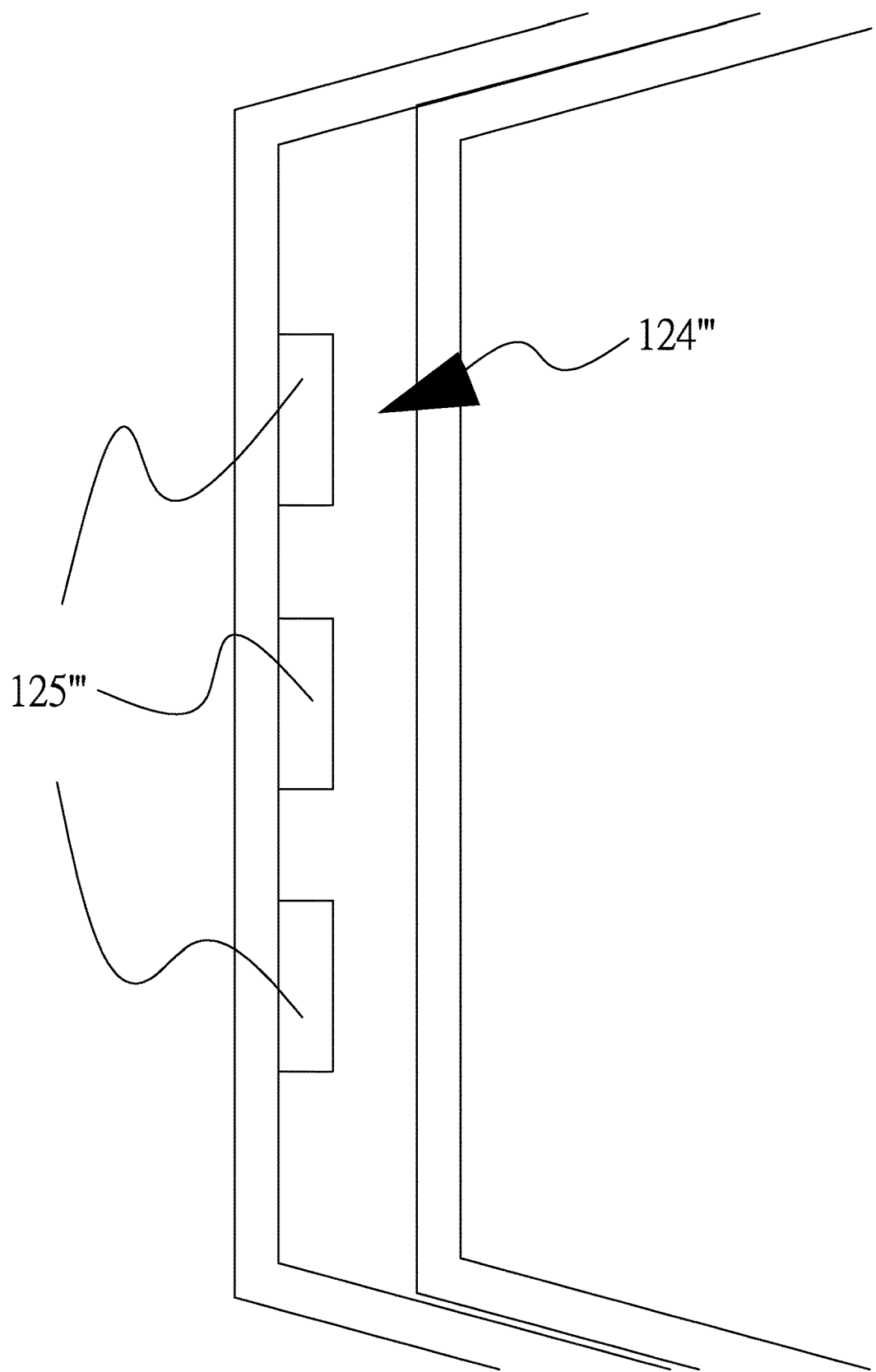
FIG. 9 is a schematic diagram illustrating the air turbulence part according to the forth preferred embodiment of the invention.
Figure 10:
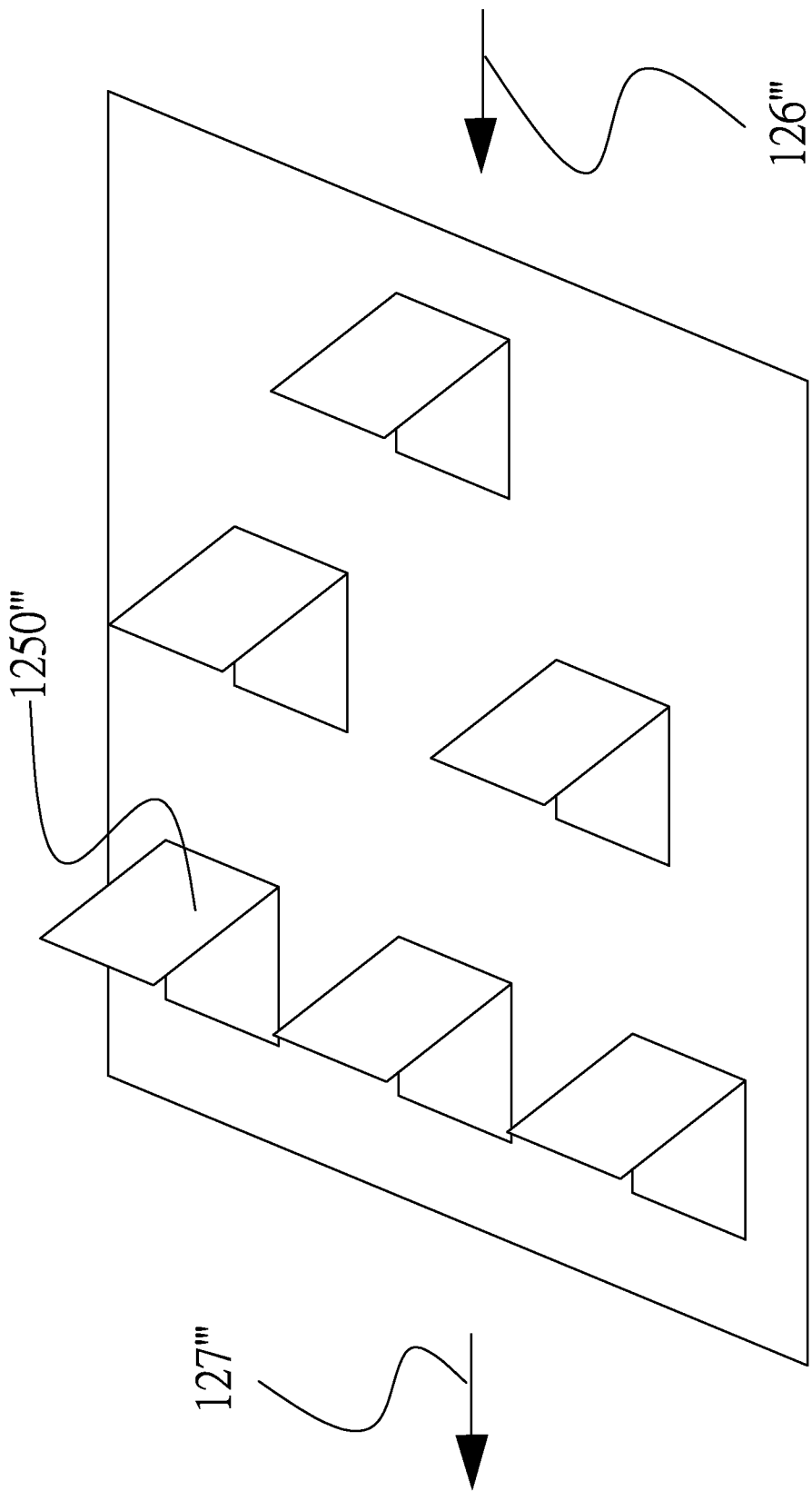
FIG. 10 is a schematic diagram illustrating the turbulence flanges according to the forth preferred embodiment of the invention.

According to the fourth embodiment shown in FIGS. 9 and 10, each heat-sink plate further comprises a part that causes flow turbulence 125"' composed of, for example, a plurality of turbulence flanges 1250"' to disturb the flowing of the fluid within the ventilation channels 124"', so that the fluid is agitated by the turbulence flanges 1250"' to increase its contact with the inner walls of the ventilation channels 124"', thereby enhancing heat exchange efficiency.

Moreover, in the case of a liquid-cooled motor where a low-temperature cooling fluid is introduced into a fluid inlet 126"' and withdrawn from a fluid outlet 127"' to remove heat, it is known that the temperature of the cooling fluid is close to the ambient temperature at the fluid inlet 126"' and gradually increases along the flowing direction due to absorbing heat. The temperature of the cooling fluid arises to the maximum near the fluid outlet 127"', where the cooling fluid may have a temperature of approximately 10° C. greater than its temperature at the fluid inlet 126"', resulting in a significant decrease in the heat exchange between the cooling fluid and the motor.

Since the motor has to be slowed down to avoid overheat when any part of it has a temperature reaching a certain limit, the part of the motor having the poorest heat dissipation efficiency becomes a limiting factor to the rotary rate of the motor. In order to minimize and even eliminate the limiting factor, the turbulence flanges 1250"' according to this embodiment is unevenly arranged along the flowing direction. As shown in FIG. 10, the longer the distance from the fluid inlet shown in the right side of the drawing, the greater the density of the turbulence flanges 1250"' formed in the ventilation channels 124"'. This arrangement leads to an increase in fluid turbulence in the ventilation channels 124"' near the fluid outlet, thereby compensating for the decrease in heat exchange efficiency. As a result, the motor can keep operating at high rotary speed without the necessity of slowing down.

In the heat-sink base disclosed herein, the engagement between the anchor portions of the heat-sink member and the holder portion of the base body is established by the Lost Foam Casting process. The engagement is so intimate that the heat transfer therebetween is maximized. Even though the heat-sink base disclosed herein comprises at least two constituting elements, the heat dissipation ability thereof is shown comparable to the monolithic heat-sink devices. Furthermore, the method disclosed herein enables the use of extremely thin metallic foils to produce the preformed heat-sink member. As a result, the overall surface area of the invented heat-sink base in contact with ambient air or other cooling fluid is increased considerably, and the heat exchange efficiency is enhanced remarkably. The heat-sink member disclosed herein has a simplified structure, in which the ventilation channels are formed directly by the heat-sink member, thereby increasing the productivity and reducing the manufacture cost. The ventilation channels function to direct air flow through the respective heat-sink fin portions to remove heat, thereby reducing the operating temperature of the motor, preventing possible damage to the motor due to overheating of the inner components and prolonging the service life of the motor. It should also be noted that the heat-sink fin portions described herein can vary in number, depending on the size of the motor to which the heat-sink member is to be applied. This flexibility further increases the usefulness of the invention. It should also be noted that the heat-sink fin portions described herein can vary in number along the ventilation path, having less heat-sink area near the cool air inlet and much more heat-sink area close to the air outlet. This configuration lowers the temperature differential along the ventilation path, lowers the maximum temperature of the device to be cooled, and further increases the usefulness of the current invention. It should be noted that the invention disclosed herein is not limited to achieving heat dissipation but is broadly applicable for the purpose of heat exchange. It is apparent to those skilled in the art that the fin portion and the turbulence part described above can also be applied to the air conditioner technology and used to facilitate the heat exchange between the ambient hot air and the coolant in an air conditioner, thereby cooling down the air.

While the present invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention. Furthermore, present invention can be applied in many products where efficient thermal energy transfer is essential, such as power supplies, engines, heat exchangers, and semiconductors.

What is claimed is:

1. A heat-sink, comprising:
    a heat-sink member, comprising a plurality of heat-sink fin portions and at least one anchor portion for each heat sink fin portion of the plurality of heat sink fin portions, the at least one heat sink fin portion extending below an outer surface of a tubular base body, wherein the plurality of heat sink fin portions is a repeatedly folded, single sheet of conductive foil; and
    the tubular base body having a base portion and a holder portion made of a same metal material and construction as the base portion, the holder portion having a plurality of portions each within one of the anchor portions, the holder portion recessed into an outer surface of the tubular base body and the holder portion having adapted to clamp the anchor portions of the heat sink member.

2. The heat-sink according to claim 1, wherein the heat-sink fin portions are composed of an aluminum alloy and wherein the tubular base body is composed of a metal.

3. The heat-sink according to claim 2, wherein, the at least one heat sink fin portion extending below an outer surface of a tubular base body is coated with a material that promotes bonding with the tubular base body.

4. The heat-sink according to claim 1, wherein the tubular base body is made using a lost foam casting process.

5. The heat-sink according to claim 1, wherein the same metal material is an aluminum alloy.

6. The heat-sink according to claim 1, wherein the same metal material is copper.

7. The heatsink according to claim 1, wherein the conductive foil comprises a metal foil.

8. A heat-sink assembly of a motor, comprising:
    a rotor,
    a stator and
    a motor housing that encloses and is thermally connected to the rotor and/or the stator, wherein the motor housing is a heat-sink base having a pattern, the heat-sink base comprises:
- a heat-sink member, comprising a plurality of heat-sink fin portions and at least one anchor portion for each heat sink fin portion of the plurality of heat sink fin portions, the at least one heat sink fin anchor portion extending below an outer surface of a tubular base body, wherein the plurality of heat sink fin portions is a repeatedly folded, single sheet of conductive foil; and
- the tubular base body comprising a base portion and a holder portion, the holder portion comprising a plurality of portions comprising a same metal material and construction as the base portion, each of the plurality of portions of the holder portion within one of the anchor portions, the holder portion recessed into an outer surface of the tubular base body and the holder portion having adapted to clamp the anchor portions of the heat sink member.

9. The heat-sink assembly of the motor of claim 8, wherein the heat-sink fin portions are composed of an aluminum alloy and wherein the tubular base body is composed of a metal.

10. The heat-sink assembly of the motor of claim 9, wherein the at least one heat sink fin anchor portion extending below an outer surface of a tubular base body is coated with a material that promotes bonding with the tubular base body.

11. The heat-sink assembly of the motor of claim 8, wherein the heat-sink base is made using a lost foam casting process.

12. The heat-sink assembly of the motor of claim 8, wherein the holder portion and the base portion comprise an aluminum alloy.

13. The heat-sink assembly of the motor of claim 8, wherein the holder portion and the base portion comprise copper.

14. The heat-sink assembly of the motor of claim 8, wherein the single sheet of conductive foil comprises a single sheet of metal foil.

* * * * *

UNITED STATES PATENT AND TRADEMARK OFFICE
CERTIFICATE OF CORRECTION

PATENT NO. : 10,914,531 B2
APPLICATION NO. : 13/940170
DATED : February 9, 2021
INVENTOR(S) : Chuang It is certified that error appears in the above-identified patent and that said Letters Patent is hereby corrected as shown below:

In the Claims

In Column 8, Claim 7, Line 61, delete "heatsink" and insert --heat-sink --, therefor.

In Column 8, Claim 8, Line 65, delete "stator" and insert -- stator, --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*